Patented Mar. 24, 1936

2,035,121

UNITED STATES PATENT OFFICE 2,035,121

PROCESS FOR MERCAPTAN CONVERSION

Per K. Frolich, Elizabeth, N. J., assignor to Standard Oil Development Company, a corporation of Delaware No Drawing. Application April 16, 1932, Serial No. 605,783

11 Claims. (Cl. 260—151)

This invention relates to new and improved processes for the conversion of mercaptans to other organic sulfur compounds and more particularly to thio-ethers. The conversion of mercaptans to thio-ethers has been described by Sabatier who stated that it is catalyzed by powdered cadmium sulfide. This reaction may be expressed as

$$2RSH \rightarrow RSR + H_2S$$

in which R may represent alkyl or aryl groups.

In a co-pending application, Serial Number 585,156, filed January 6, 1932, by William Seaman and John R. Huffman, it is shown that substantially all metallic sulfides, especially the sulfides of magnesium, calcium, zinc, strontium, barium, mercury, copper, aluminum, cobalt, iron, tin, bismuth, lead, cerium, tungsten, chromium, manganese and nickel are catalysts for the conversion of mercaptans to thio-ethers.

I have now found that the activity and stability of mercaptan conversion catalysts may be greatly improved by the addition of a suitable activating agent to the catalyst. Among these activating agents may be mentioned metallic oxides and especially the oxides of alkaline earth and earth metals and of the VI and VII groups of elements such as chromium, tungsten and manganese which oxides may be stable under the conditions of the catalytic reaction or may be converted into sulfides, oxy-sulfides and the like. Metallic sulfides are also desirable activators for catalysts containing sulfides of other metals. Substantially all the metal sulfides, especially those mentioned specifically above as suitable catalysts, are suitable as catalyst activators so that a catalyst composed of a mixture of two or more sulfides is considered an activated catalyst for the purpose of this invention.

The metals themselves or compounds of the metals capable of being converted at least in part into metallic sulfides under the reaction conditions may be used as activators in place of the metallic sulfides. Certain substances normally considered as supports or diluents also have activating properties for these catalysts. Among these substances may be mentioned adsorbents such as activated silica, charcoal and the like; refractories such as magnesia, asbestos, alumina and chromium oxide refractories; and naturally occurring clays such as bauxite. Granular or finely divided metals such as aluminum may also be used. All such activating agents tending to increase the activity and/or life of metal sulfide catalysts in the mercaptan conversion reactions are classified as "promoters" for the purpose of this invention.

The following catalyst compositions have been found to be especially suitable for mercaptan conversion:

1. Mixtures of the sulfides of the II group of elements such as a mixture of cadmium and zinc sulfides. This mixture may consist of the sulfides in all proportions but a smaller proportion of zinc sulfide, say from 1 to 25% by weight and more specifically from 2 to 10% based on the total amount of zinc and cadmium sulfides, gives the most active catalysts.

2. Mixtures of sulfides of the metals of the II and IV groups of elements such as catalysts consisting of the sulfides of cadmium and lead or zinc and tin, are very active.

3. Mixtures of sulfides of the metals of the II and VI groups of elements such as mixtures containing cadmium and chromium sulfides or cadmium and tungsten sulfides, show good activity. A mixture of the sulfides of cadmium and chromium distributed on activated charcoal is even more active.

4. Mixtures of the sulfides of the metals of the VII and VIII groups of elements are good catalysts and a mixture containing iron and manganese sulfides is very active.

The addition of relatively small amounts of alumina in activating proportions up to about 30% of the total weight of the catalyst is especially desirable in preparing catalysts of great stability and substantially constant activity from any of the above combinations. Oxides of chromium and manganese may also be used in similar activating proportions.

These sulfides may be prepared by precipitation with hydrogen sulfide, sodium sulfide and the like from solutions of salts of the respective metals. Mixed sulfides may be co-precipitated by this means from a solution containing salts of the desired metals. The sulfides may also be prepared from the metals, oxides or other suitable compounds with hydrogen sulfide in the dry way preferably at elevated temperatures, or they may be formed during the mercaptan conversion reaction and it is understood that this invention includes also the use of the corresponding oxides, carbonates or other compounds as catalysts which may be converted wholly or partly to sulfides during the mercaptan conversion process.

The above catalysts may be classified generally as dehydrunsulfing catalysts since they promote the conversion of mercaptan to thio-ether, which reaction proceeds with the elimination of hydrogen sulfide. These catalysts under suitable reaction conditions also promote the conversion of mercaptans into relatively higher molecular weight mercaptans. These catalysts, especially those containing nickel and other actively dehydrogenating substances, exert also a dehydrogenating influence and promote the conversion of mercaptans into thio-aldehydes, disulfides, thioesters and other organic sulfur compounds. The dehydrogenating and dehydrunsulfing tendencies may be aided or suppressed as desired by suitable removal or addition of hydrogen and hydrogen sulfide from the reaction zone.

The mercaptan conversion reaction is preferably conducted by passing vaporized mercaptans under suitable temperature and pressure conditions over a stationary solid catalyst. The reaction product is then cooled to condense out the normally liquid products and the uncondensed gaseous products may be recirculated over the catalyst with added mercaptans. These uncondensed gaseous products contain hydrogen sulfide, hydrogen, olefines, and mercaptan vapors. The mercaptan vapors may be recovered from these gases by rectification, or by scrubbing with an alkaline agent, or a hydrocarbon liquid such as naphtha, kerosene or gas oil.

While both alkyl and aryl mercaptans may be used in this process, the relatively low molecular weight mercaptans obtained from petroleum oils such as sour cracked naphthas are especially suitable. These mercaptans may be readily separated from naphthas and other hydrocarbon oils by washing with an aqueous caustic solution and subsequently distilling the mercaptans from this solution with steam. The product thus obtained constitutes a rather complex mixture of mercaptans which consists primarily of methyl, ethyl, propyl, and butyl mercaptans. This product may be used directly as a feed stock in the herein disclosed process. However, it may be desirable to use as a feed stock a distillate fraction boiling within a range of about 25 to 50° C., as optimum conditions of operation may vary slightly with increasing boiling points of the mercaptans used. For example, the fractions boiling below 50° C., between 50 and 75° C., and above 75° C. may be used separately to advantage in the present process.

Where the mercaptans to be converted are secured from petroleum fractions it is generally preferable to subject them to an initial treatment for the removal of undesirable components or catalyst poisons. This may be effectively accomplished by passing the mercaptan vapor at an elevated temperature of about 150 to 350° C. insufficient to cause appreciable reaction of the mercaptan, over an active adsorbent such as activated carbon, decolorizing clays, and the like. The purification may also be conducted at similar temperatures over spent catalysts from the mercaptan conversion process. It is preferable to pass the mercaptan vapors after passage over the purifying mass through a partial condenser or rectifier in which any polymerized and higher boiling material is condensed. This condensate is removed from the mercaptan vapor before passing it over the catalyst.

Other purification methods such as treatment with weak or concentrated sulfuric acid, clay, aluminum chloride or dilute nitric acid in liquid phase, or a treatment of the vapors with a hot concentrated zinc chloride solution may be used.

The following examples are illustrative of a few of my specific catalysts:

5. Ethyl mercaptan was passed at a space velocity of 1.13 grams of mercaptan per cc. of catalyst per hour and at a temperature of 356° C. over a catalyst containing one part of lead sulfide to three parts of cadmium sulfide. A yield of 40% of ethyl thio-ether and less than 1% of gas loss was secured with a single pass over the catalyst.

6. A yield of 53% of thio-ether with 7.4% gas loss was secured in passing ethyl mercaptan at 0.17 space velocity and 300° C. over a catalyst consisting of one part cadmium sulfide, one part zinc sulfide and one part of activated charcoal.

7. A yield of 45% thio-ether with 31.2% gas loss was secured with a space velocity of 0.15 and a temperature of 305° C. over a catalyst prepared in the same manner as in Example 6 but containing an addition of 1% of chromic oxide. On increasing the space velocity to 0.45, the gas loss was decreased to 14.5% while the yield decreased only to 39%. This is an especially active catalyst and is particularly suitable for use in recycling operations where the gas loss is decreased.

8. Using a catalyst prepared by converting cadmium tungstate into sulfides of cadmium and tungsten with hydrogen sulfide in the dry way a yield of 32.5% thio-ether and a gas loss of 35% was secured at a space velocity of 0.12 at 310° C. This catalyst is also especially active and may be used with greater yields in recycle operation.

9. Ethyl mercaptan was passed at a temperature of 305° C. and a space velocity of 0.17 over a catalyst consisting of 50% cadmium sulfide and 50% zinc sulfide. 58.3% of the mercaptan was converted to thio-ether with a gas loss of 11.2%.

10. A catalyst containing 50% iron sulfide and 50% manganese sulfide showed a conversion of 42.3% of ethyl mercaptan to thio-ether with a gas loss of 13.5% at 295° C. and a space velocity of 0.76.

11. A catalyst containing 50% zinc sulfide and 50% tin sulfide showed a conversion of 52.9% of ethyl mercaptan to thio-ether with 10.9% gas loss at a space velocity of 0.14 and a temperature of 283° C.

12. With a catalyst containing 95 parts of cadmium sulfide and 5 parts of zinc sulfide and 95 parts of alumina a yield of 63% thio-ether and 2% gas loss was secured with a space velocity of about 0.25 and at a temperature of 300° C.

The use of superatmospheric pressure to prevent gas loss and of controlling concentrations of hydrogen, hydrogen sulfide, olefines and mercaptans in the reaction zone to favor the dehydrunsulfing or dehydrogenation reactions is shown in the co-pending application "Mercaptan conversion", Serial Number 603,922, filed April 8, 1932, by Frolich and Wiezevich.

My invention is not to be limited to any specific disclosure given above merely by way of example, nor to any theory of the activity of the catalysts, nor to the mechanisms of the reactions, but only by the following claims in which I wish to claim all novelty as far as the prior art permits.

I claim:

1. A process for the conversion of mercaptans to other organic sulfur compounds which comprises contacting said mercaptans at an elevated temperature suitable for the conversion of a mercaptan to a thioether with a catalyst, which, during the conversion, essentially comprises a mixture of metal sulfides supported on a refractory carrier.

2. A process according to claim 1 in which the carrier is alumina.

3. A process for the conversion of mercaptans to corresponding thioethers which comprises contacting said mercaptans at an elevated temperature suitable for the conversion with a catalyst which, during the reaction, essentially comprises a mixture of cadmium and zinc sulfides supported on a refractory carrier.

4. A process according to claim 3 in which the refractory carrier is alumina.

5. A process for the conversion of mercaptans to other organic sulfur compounds, which comprises contacting said mercaptans at an elevated temperature suitable for the conversion of a mercaptan to a thioether with a catalyst which, during the conversion, essentially comprises a mixture of sulfides of two or more metals.

6. A process for the conversion of mercaptans to corresponding thioethers, which comprises contacting said mercaptans at an elevated temperature suitable for the conversion with a catalyst which, during the conversion, essentially comprises a mixture of sulfides of metals of group II of the periodic table.

7. A process for the conversion of mercaptans to corresponding thioethers, which comprises contacting said mercaptans at an elevated temperature suitable for the conversion with a catalyst essentially comprising a mixture of cadmium and zinc sulfides.

8. A process for the conversion of mercaptans to corresponding thioethers, which comprises contacting said mercaptans at a temperature of about 300° C. with a catalyst essentially comprising a mixture of cadmium and zinc sulfides, the zinc sulfide constituting from 1% to 25% of the combined sulfides.

9. A process for the conversion of mercaptans to corresponding thioethers, which comprises contacting said mercaptans at a temperature of about 300° C. with a catalyst essentially comprising a mixture of the sulfides of cadmium and zinc distributed on activated carbon and containing from 2 to 10% of zinc sulfide based on the total sulfides.

10. A process for the conversion of mercaptans to corresponding thioethers, which comprises contacting said mercaptans at an elevated temperature suitable for the conversion with a catalyst essentially comprising a mixture of sulfides of metals of the VI group of elements.

11. A process for the conversion of mercaptans to corresponding thioethers, which comprises contacting said mercaptans at an elevated temperature suitable for the conversion with a catalyst which, during the conversion essentially comprises a mixture of sulfides of iron and manganese.

PER K. FROLICH.